Aug. 8, 1961 R. E. KRUM 2,995,135
COMBINE CHAFF AND GRAIN CONVEYOR
Filed Aug. 22, 1958 2 Sheets-Sheet 1

Robert E. Krum
INVENTOR.
BY
Attorneys

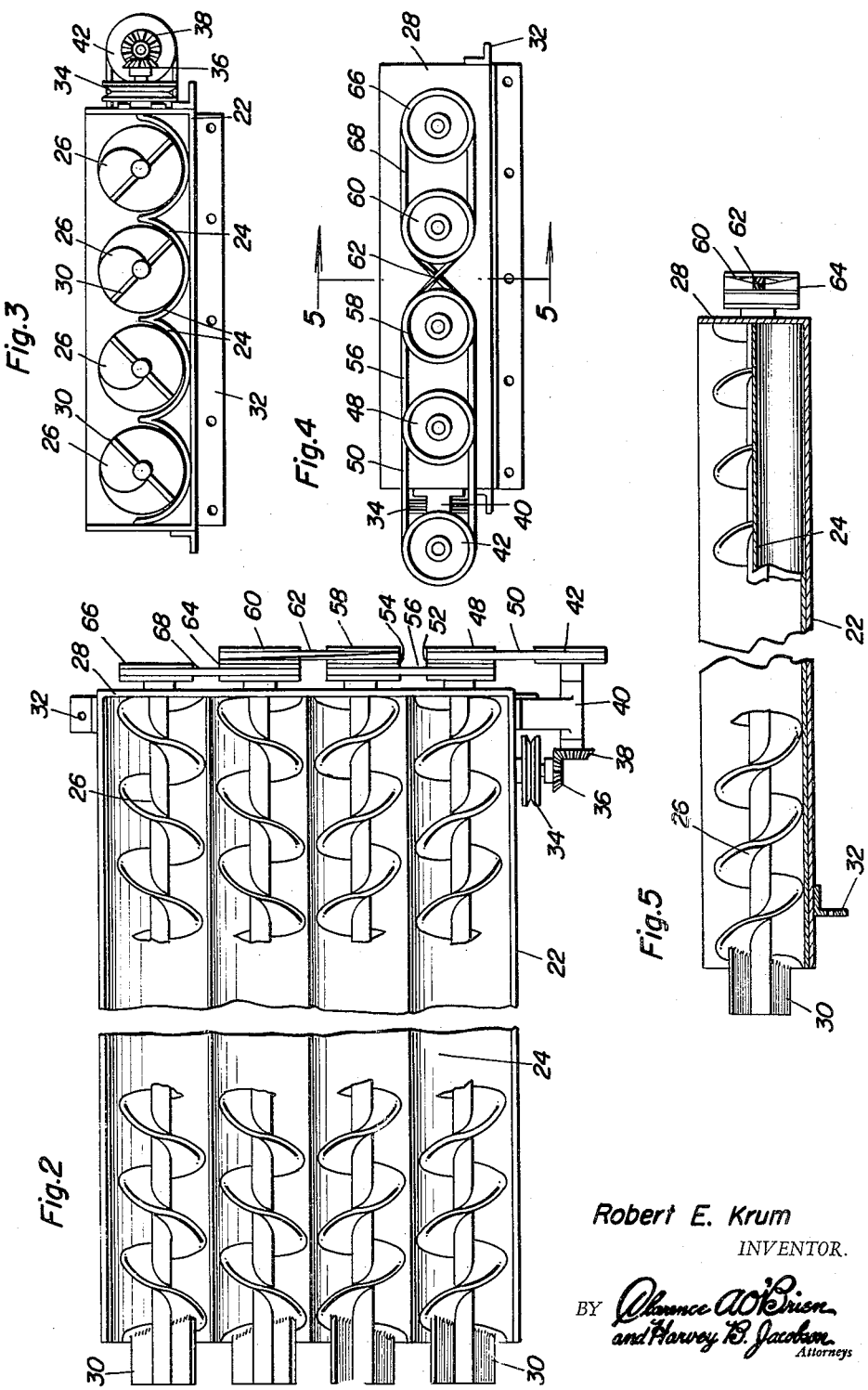

United States Patent Office 2,995,135
Patented Aug. 8, 1961

2,995,135
COMBINE CHAFF AND GRAIN CONVEYOR
Robert E. Krum, R.D. 2, Catawissa, Pa.
Filed Aug. 22, 1958, Ser. No. 756,703
1 Claim. (Cl. 130—27)

The present invention generally relates to a combine construction and more particularly to an improved and novel construction in the chaff and grain conveyor of a combine.

Combines work effectively when traveling on substantially level ground. However, when combines are used on sloping terrain, such as on the side of hills or on the side of mountains, a considerable quantity of grain will be discharged from the machine along with the chaff and straw. This is due to the tendency of the grain to flow to the downhill side of the machine, while the grain and chaff are being conveyed rearwardly, thus rendering the chaff separation ineffective. Normally, the grain and chaff are discharged from the grain pan or chaff and grain conveyor over a relatively wide area, with there being a fan for blowing air through the mixed chaff and grain for removing the chaff. When the conventional combine operates on a hillside, the chaff and grain will pile up at one side edge when being discharged, thereby preventing passage of air through the material as it discharges, thus causing a considerable loss of grain which is discharged from the rear of the chaffer. Therefore, it is the primary object of the present invention to provide a grain and chaff conveyor which will maintain a normal and even distribution of the chaff and grain mixture along the widths of its travel by means of a plurality of longitudinally extending conveyor assemblies, each maintaining a separate path for a predetermined increment of width of the path of movement of the grain and chaff.

A further object of the present invention is to provide a grain and chaff conveyor for combines including a series of longitudinally extending trough-shaped members having a screw auger placed therein for moving the grain and chaff together with a fan or spreader at the discharge end of each trough, whereby the material will be thrown vertically so that the fan may more effectively blow the chaff from the grain.

Yet another object of the present invention is to provide a grain and chaff conveyor which is simple in construction, easy to use, easily assembled onto existing conventional combines and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a plan view of the conveyor assembly;

FIGURE 3 is an end view of the construction of FIGURE 2 looking at the discharge end thereof;

FIGURE 4 is an end view of the construction of FIGURE 2 looking at the drive end thereof; and FIGURE 5 is a longitudinal sectional view taken substantially upon a plane passing along section line 5—5 of FIGURE 4.

Figure 1:
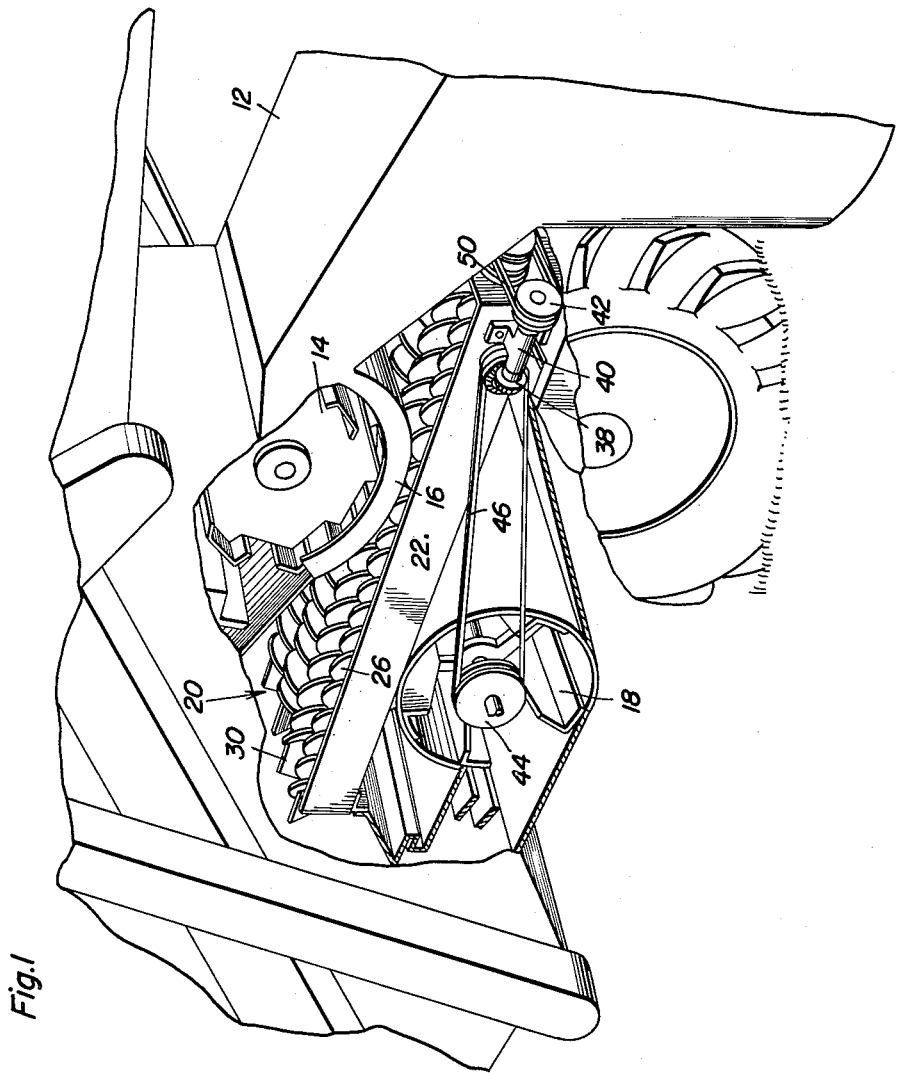
FIGURE 1 is a perspective view of a portion of the combine with parts of the casing broken away illustrating the assembly of the present invention installed in its relationship to the other components of the combine.

The fragment of the combine illustrated in FIGURE 1 embodies at its extreme forward portion a customary platform feeder or grain cutter and harvester (not shown) leading into an elevating mechanism which is disposed within a forward housing 12 and is arranged to discharge the cut and elevated stalks of grain into the conventional threshing cylinder 14 which separates most of the grain from the straw, with the grain dropping down through the bar grate 16 and the straw being discharged to the usual straw walkers. Along with the grain which is discharged from the bar grate 16 is a considerable amount of chaff. Normally, there is provided a conveyor arrangement for the grain and chaff which carries the grain and chaff rearwardly onto a chaffer, with there being an enlarged radial fan 18 for providing an air flow for separating the chaff from the grain. It is this conventional chaff and grain conveyor which the present invention replaces and the present invention is generally designated by the numeral 20 and will effectively convey the grain from the threshing cylinder 14 rearwardly with a normal distribution completely over the width of the machine. Generally, the grain conveyor which is conventionally provided has very slight longitudinal projections, thus enabling the grain to flow to one side of the chaff and grain conveyor if the machine is being operated on the side of a hill. This is especially true due to the tendency of grain to flow or seek its own level and further in view of the reciprocatory motion given to the grain by the chaff and grain conveyor.

The chaff and grain conveyor 20 of the present invention includes a longitudinally extending, generally rectangular housing 22 having a plurality of substantially semi-cylindrical troughs 24 extending longitudinally therein and mounted radially therein, with the housing 22 and the troughs 24 being open for receiving grain completely across the width of the bar grate 16. Mounted in each of the troughs 24 is a screw auger 26, each of which is provided with a shaft extending through the closed forward end 28 of the receptacle 22. The rear end of each screw auger 26 is provided with a transverse plate 30 projecting from the rear end of the U-shaped trough 24, whereby grain discharged by the screw auger 26 will be given a vertical or radial direction of flight. Suitable bracket structures 32 are provided for mounting the conveyor of the present invention in underlying relation to the threshing cylinder. Also mounted on the side of the receptacle or housing 22 adjacent the rear end thereof is a V-belt pulley 34 driving a bevel gear 36 which is in meshing engagement with a bevel gear 38 rotatably supported by a bracket 40 and carrying a V-belt pulley 42 thereon. The pulley 34 receives a power from a similar pulley 44 driven from the shaft of the radial fan with the power being transmitted by a suitable V-belt 46. Thus, power is supplied to the shaft which supports the pulley 34 and gear 36 and thence to the shaft supporting the gear 38 and pulley 42.

The screw auger 26 nearest the pulley 42 is provided with a driven pulley 48, with a V-belt 50 interconnecting the same. This same shaft is provided with a drive pulley 52 which is in alignment with a driven pulley 54 on the next adjacent shaft and which is connected thereto V-belt 56. The second shaft is also provided with a drive pulley 58 which is in alignment with a driven pulley 60 on the third shaft and a crossed V-belt 62 is provided for driving the third screw auger in reverse relation to the other two screw augers. Also mounted on this shaft with the driven pulley 60 is the drive pulley 64 in alignment with the driven pulley 66 on the outermost screw auger 26 and which is connected by a V-belt 68. Thus, with the present drive, the two nearest screw augers are driven clockwise, while the two most remote screw augers are driven in a counterclockwise direction and the flights on the screw augers 26 have a lead which will effectively transfer the grain longitudinally and discharge the same at the outer open end of the troughs 24 so that the transverse blades 30 will effectively throw the material so that the fan 18 will effectively separate the chaff from the grain. It is pointed out that the construction of the troughs 23 is such that grain cannot flow laterally from one trough to the other, thereby maintaining a plurality of independent paths of movement of the grain and chaff thus eliminating the collection or gathering of the grain and chaff at either side of the grain and chaff conveyor, depending upon which side of the combine is lowest.

Thus, with the separated and independent conveyors formed by the multiplicity of troughs, the grain will be positively prevented from moving laterally and gathering at the lower side of the usual grain pan or conveyor, and while the particular mounting details may vary depending upon the particular type of combine the device is used with, the principles of the invention will be maintained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination with a combine having a threshing cylinder and bar grate for discharging grain and chaff and a fan for separating the grain and chaff, a conveyor assembly mounted on the combine below the bar grate for receiving and transferring the grain and chaff rearwardly, said conveyor assembly including a plurality of individual and separate conveyors disposed in side-by-side relation, each of said conveyors including a generally U-shaped imperforate trough, a screw auger positioned in said trough for carrying the grain rearwardly upon rotation of the screw auger, each trough receiving grain and chaff from a predetermined increment of width of the bar grate and transferring the same rearwardly while preventing lateral movement thereof.

References Cited in the file of this patent
UNITED STATES PATENTS

| | | |
|---|---|---|
| 796,233 | Mann | Aug. 1, 1905 |
| 1,781,472 | Nagle | Nov. 11, 1930 |
| 1,797,871 | Lippert | Mar. 24, 1931 |
| 2,549,852 | Pratt | Apr. 24, 1951 |